United States Patent
Inoue et al.

(10) Patent No.: US 7,216,540 B2
(45) Date of Patent: May 15, 2007

(54) SIX-LEGGED TYPE PIEZOELECTRIC VIBRATION GYROSCOPE

(75) Inventors: Takeshi Inoue, Tokyo (JP); Mitsuru Yamamoto, Tokyo (JP); Atsushi Ochi, Tokyo (JP); Kenji Kuramoto, Tokyo (JP); Mitsuhiro Nakajima, Tokyo (JP)

(73) Assignees: Nec Corporation, Tokyo (JP); Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/548,102

(22) PCT Filed: Mar. 5, 2004

(86) PCT No.: PCT/JP2004/002874

§ 371 (c)(1),
(2), (4) Date: May 25, 2006

(87) PCT Pub. No.: WO2004/079296

PCT Pub. Date: Sep. 16, 2004

(65) Prior Publication Data

US 2006/0230828 A1      Oct. 19, 2006

(30) Foreign Application Priority Data

Mar. 6, 2003  (JP) ............................. 2003-059856

(51) Int. Cl.
*G01P 9/04* (2006.01)
(52) U.S. Cl. .................................... 73/504.16; 310/370

(58) Field of Classification Search ............. 73/504.16, 73/504.15, 504.12; 310/370
See application file for complete search history.

(56) References Cited

U.S. PATENT DOCUMENTS

| 5,451,828 | A  | * | 9/1995  | Tomikawa et al. ....... 73/504.16 |
| 6,490,925 | B2 | * | 12/2002 | Inoue et al. ............. 73/504.16 |
| 6,675,651 | B2 | * | 1/2004  | Yanagisawa et al. .... 73/504.14 |

FOREIGN PATENT DOCUMENTS

| JP | 8-201063 | 8/1996 |
| JP | 11-014373 | 1/1999 |
| JP | 2001-208545 | 8/2001 |

* cited by examiner

*Primary Examiner*—John E. Chapman
(74) *Attorney, Agent, or Firm*—Young & Thompson

(57) ABSTRACT

A six-legged type piezoelectric vibration gyroscope having a pair of exciting arms extending from a body (2) in a first direction (A1) with a space therebetween, one non-exciting arm (3c) extending in the first direction between the exciting arms from the body, a pair of detecting arms (4a, 4b) extending from the body in a second direction (A2) with a space therebetween, and one non-detecting arm (4c) extending in the second direction between the detecting arms from the body. The exciting arms are coupled with a drive-side electrode. The detecting arms are coupled with a detection-side electrode. The exciting arms, non-exciting arm, detecting arms, and non-detecting arm respectively consist of a piezoelectric. The respective exciting arms differ in width size from the non-exciting arm. The respective exciting arms differ in width size from the respective detecting arms. The respective exciting arms differ in width size from the non-detecting arm.

13 Claims, 9 Drawing Sheets

SIX-LEGGED TYPE PIEZOELECTRIC VIBRATION GYROSCOPE

TECHNICAL FIELD

The present invention relates to a gyroscope used as an angular velocity detector for a car navigation system or an attitude control system for ships and, more specifically, relates to a piezoelectric vibratory gyroscope.

BACKGROUND ART

A six-arm piezoelectric vibratory gyroscope that is capable of detecting angular velocity in a highly accurate manner is disclosed in Japanese Unexamined Patent Application Publication No. 2001-255152. The six-arm piezoelectric vibratory gyroscope includes a piezoelectric body, and drive-side electrodes and detection-side electrodes coupled with the piezoelectric body. The piezoelectric body includes a flat rectangular body having front and back surfaces as main surfaces, a drive-side arm unit extending from one of two opposing sides of the body, and a detection-side arm unit extending from the other side of the body. The drive-side arm unit includes a pair of exciting arms and a non-exciting arm interposed between the exciting arms. The detection-side arm unit includes a pair of detecting arms and a non-detecting arm interposed between the detecting arms. On each of the exciting arms, the drive-side electrodes for exciting in-plane vibration in a direction parallel to the main surfaces of the body are provided. On each of the detecting arms, the detection-side electrodes for detecting plane-perpendicular vibration in a direction perpendicular to the main surfaces of the body are provided. Usually, the exciting arms, the non-exciting arm, the detecting arms, and the non-detecting arm are all produced with the same width and thickness so that they are suitable for mass-production.

To provide a highly sensitive six-arm piezoelectric vibratory gyroscope, the resonant frequency in a driving vibration mode (i.e., in-plane vibration) of each arm of the drive-side arm unit and the resonant frequency in a detection vibration mode (i.e., plane-perpendicular vibration) of each arm of the detection-side arm unit must be similar values. However, in such a case, the plane-perpendicular vibration and the in-plane vibration of each of the six arms become similar to each other. Therefore, spurious frequencies are generated in the vicinities of the driving vibration mode and the detection vibration mode, and the spurious vibration of the in-plane vibration is excited so as to mechanically couple the arms to a piezoelectric transducer or a piezoelectric body. As a result, the gyro sensitivity, i.e., the detection sensitivity, is significantly reduced. In particular, since the intensity of the spurious vibration of the in-plane vibration is significantly greater than the intensity of the spurious vibration of the plane-perpendicular vibration, the gyro sensitivity is reduced.

DISCLOSURE OF INVENTION

Accordingly, an object of the present invention is to provide a piezoelectric vibratory gyroscope having excellent gyro sensitivity and being capable of detecting angular velocity in a highly accurate manner.

A piezoelectric vibratory gyroscope according to an aspect of the present invention includes a body, a pair of exciting arms extending from the body in a first direction with a space therebetween, a non-exciting arm extending from the body in the first direction between the exciting arms, a pair of detecting arms extending in a second direction opposite to the first direction from the body with a space therebetween, a non-detecting arm extending from the body in the second direction between the detecting arms, drive-side electrodes coupled with each of the exciting arms, and detection-side electrodes coupled with each of the detecting arms, wherein the exciting arms, the non-exciting arm, the detecting arms, and the non-detecting arm each consist of a piezoelectric body, the width of the exciting arms and the width of the non-exciting arm differ, the width of the exciting arms and the width of the detecting arms differ, and the width of the exciting arms and the width of the non-detecting arm differ.

BEST MODE FOR CARRYING OUT THE INVENTION

Figure 1:
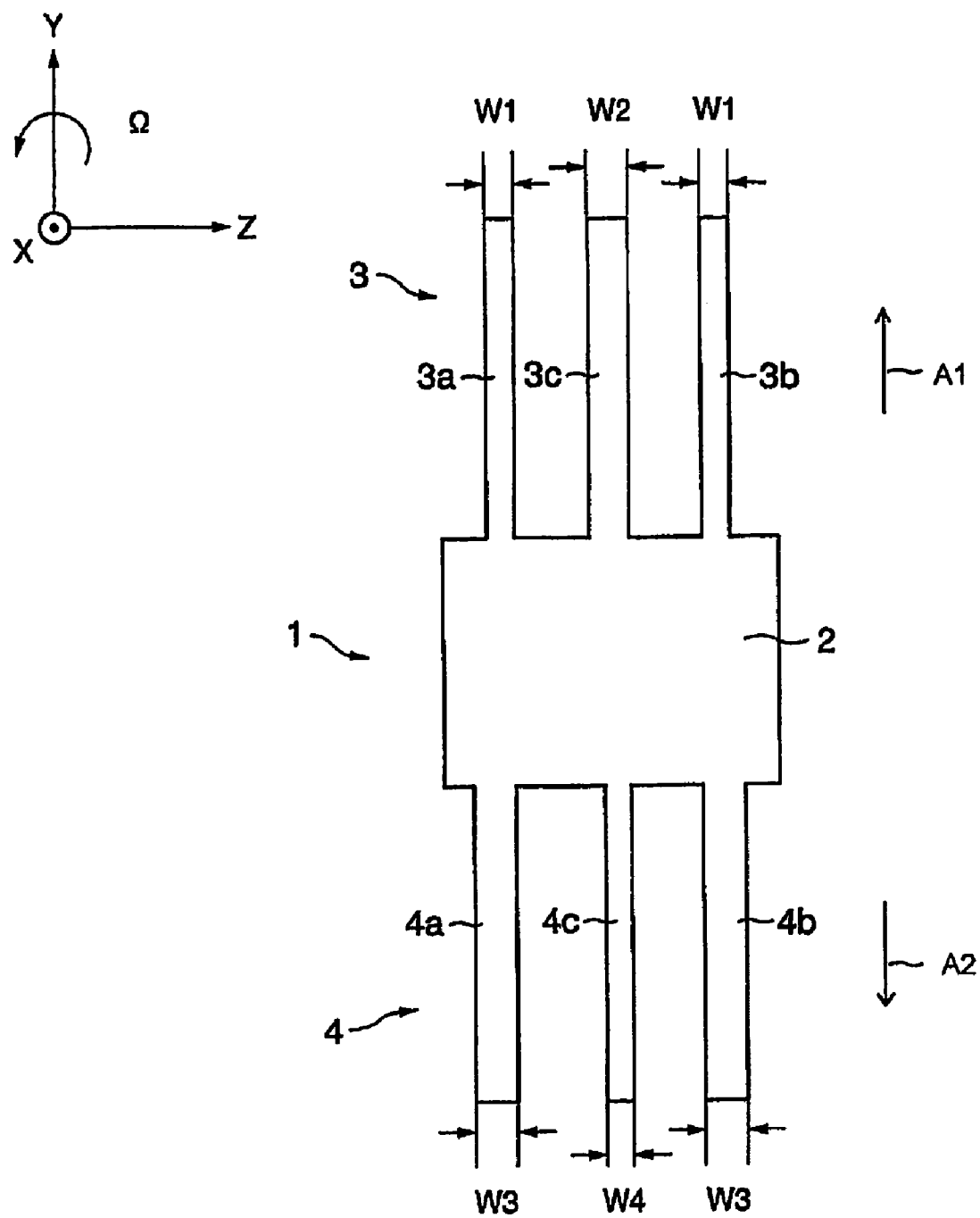
FIG. 1 is a front view of a piezoelectric body included in a six-arm piezoelectric vibratory gyroscope according to a first embodiment of the present invention.
Figure 2A:
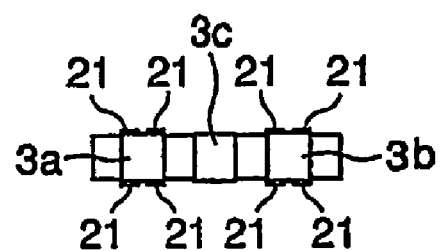
FIG. 2A is a top view of the six-arm piezoelectric vibratory gyroscope illustrated in FIG. 1 having electrodes coupled with the piezoelectric body.
Figure 2B:
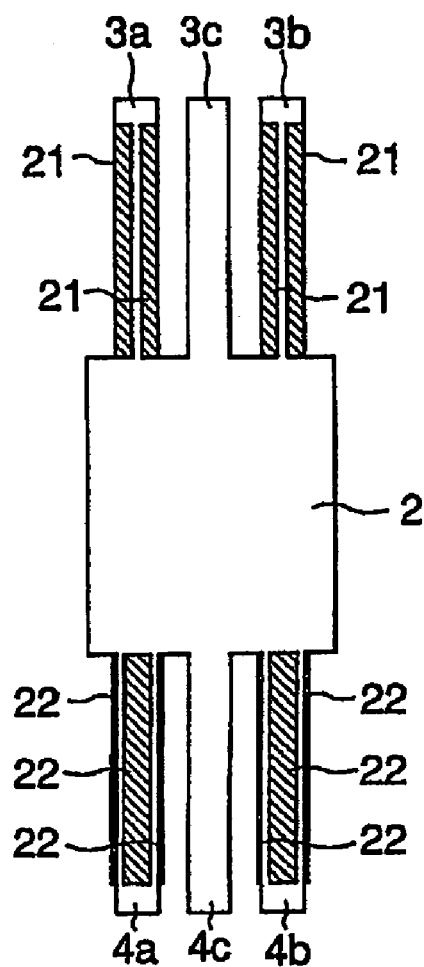
FIG. 2B is a front view of the six-arm piezoelectric vibratory gyroscope illustrated in FIG. 2A.
Figure 2C:
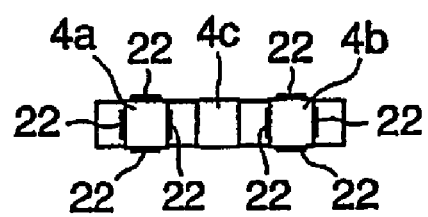
FIG. 2C is a bottom view of the six-arm piezoelectric vibratory gyroscope illustrated in FIG. 2A.

A six-arm piezoelectric vibratory gyroscope according to a first embodiment of the present invention will be described with reference to FIGS. 1 and 2.

The six-arm piezoelectric vibratory gyroscope includes a piezoelectric body 1 composed of X-cut langasite crystal. In FIG. 1, the directionality and active direction of angular velocity Ω of langasite, which belongs to a trigonal crystal system, are represented by X, Y, and Z axes. The piezoelectric body 1 may be composed of X-cut quartz.

The piezoelectric body 1 includes a rectangular body 2 having front and back surfaces as main surfaces, a pair of exciting arms 3a and 3b extending in a first direction A1 from a side of the body 2 with a predetermined distance between each other, a non-exciting arm 3c extending in the first direction A1 from a side of the body 2 between the exciting arms 3a and 3b, a pair of detecting arms 4a and 4b extending in a second direction A2 opposite to a first direction A1 from an opposite side of the body 2 with a predetermined distance between each other, and a non-detecting arm 4c extending in the second direction A2 from the opposite surface of the body 2 between the detecting arms 4a and 4b.

The exciting arms 3a and 3b and the non-exciting arm 3c are parallel to each other and are parallel to the main surfaces of the body 2. The exciting arms 3a and 3b and the non-exciting arm 3c are prismatic. The detecting arms 4a and 4b and the non-detecting arm 4c are parallel to each other and are parallel to the main surfaces of the body 2. The detecting arms 4a and 4b and the non-detecting arm 4c are prismatic. The exciting arms 3a and 3b, the non-exciting arm 3c, the detecting arms 4a and 4b, and the non-detecting arm 4c each have an arm length of 5.5 mm.

The body 2 functions to prevent in-plane vibratory waves generated at the exciting arms 3a and 3b from being transmitted to the detecting arms 4a and 4b. In this way, an angular velocity Ω at the detecting arms 4a and 4b can be detected using the Coriolis force generated when the piezoelectric body 1 rotates around the Y axis at an angular velocity Ω.

In the following, the exciting arms 3a and 3b and the non-exciting arm 3c are collectively referred to as a drive-side arm unit 3, and the detecting arms 4a and 4b and the non-detecting arm 4c are collectively referred to as a detection-side arm unit 4. In the drive-side arm unit 3, the width of each of the exciting arms 3a and 3b is W1 and the width of the non-exciting arm 3c is W2. In the detection-side arm unit 4, the width of each of the detecting arms 4a and 4b is W3 and the width of the non-detecting arm 4c is W4. Each of the widths W1, W2, W3, and W4 is set at a different value, and the geometric center of the body 2 is matched with the center of gravity of the piezoelectric body 1. As a result, the six-arm piezoelectric vibratory gyroscope can be supported at its center of gravity.

The widths W1, W2, W3, and W4 will be described below.

The width W1 of each of the exciting arms 3a and 3b is 420 μm. The width W2 of the non-exciting arm 3c is 500 μm, which is about 19% greater than the width W1. The width W3 of each of the detecting arms 4a and 4b is 440 μm, which is about 5% greater than the width W1. The width W4 of the non-detecting arm 4c is 460 μm, which is 8% smaller than the width W2. By these widths W1, W2, W3, and W4, the three arms of the drive-side arm unit 3 and the three arms of the detection-side arm unit 4 have the same weight while the center of gravity is matched with the geometric center of the body 2.

To support the center of gravity of the piezoelectric body 1 with alumina and to adjust the difference between the resonant frequency of the exciting arms 3a and 3b and the resonant frequency of the detecting arms 4a and 4b, detuning width processing is carried out on each tip of the exciting arms 3a and 3b and the detecting arms 4a and 4b. More specifically, mass is added to the tips by forming films by plating the tips with gold, which is conductive metal. Then, detuning width processing is carried out by laser trimming the plated film. In this way, the difference of the resonant frequency of the in-plane vibration and the resonant frequency of the plane-perpendicular vibration is adjusted to be 30 Hz or less.

As a result of determining the spurious vibration of the in-plane vibration of the piezoelectric body 1 by a finite element method (FEM) analysis and actual measurements, it was concluded that spurious vibration is not generated in the ±200 Hz range of the driving resonant frequency 8,767 Hz. It has become apparent that since the intensity of the spurious vibration of the plane-perpendicular vibration is significantly smaller than the intensity of the spurious vibration of the in-plane vibration and since the spurious vibration of the plane-perpendicular vibration has a frequency that is about 280 Hz different from the driving resonant frequency, the spurious vibration of the plane-perpendicular vibration does not affect the gyro sensitivity. It has also become apparent that highly sensitive gyro characteristics are obtained when a six-arm piezoelectric vibratory gyroscope produced using the piezoelectric body 1 is driven at a frequency of 8,767 Hz and a driving voltage of 1 $V_{p\text{-}p}$ and is rotated around the Y axis at an angular velocity Ω of 3 deg/s so that the gyro output is 0.36 mV.

Each of the exciting arms 3a and 3b is coupled with a plurality of drive-side electrodes 21. In other words, each of the front and back surfaces of each of the exciting arms 3a and 3b is coupled with two drive-side electrodes 21, wherein a total of four drive-side electrodes 21 are coupled with each of the exciting arms 3a and 3b. The drive-side electrodes 21 excite the in-plane vibration of the exciting arms 3a and 3b and are disposed as strips provided parallel to each other at a predetermined distance apart.

Each of the detecting arms 4a and 4b is coupled with a plurality of detection-side electrodes 22. In other words, each of the surfaces of each of the detecting arms 4a and 4b is coupled with one of the detection-side electrodes 22, wherein a total of four detection-side electrodes 22 are coupled with each of the detecting arms 4a and 4b. The detection-side electrodes 22 detect plane-perpendicular vibration of the detecting arms 4a and 4b and are disposed as strips.

Figure 3:
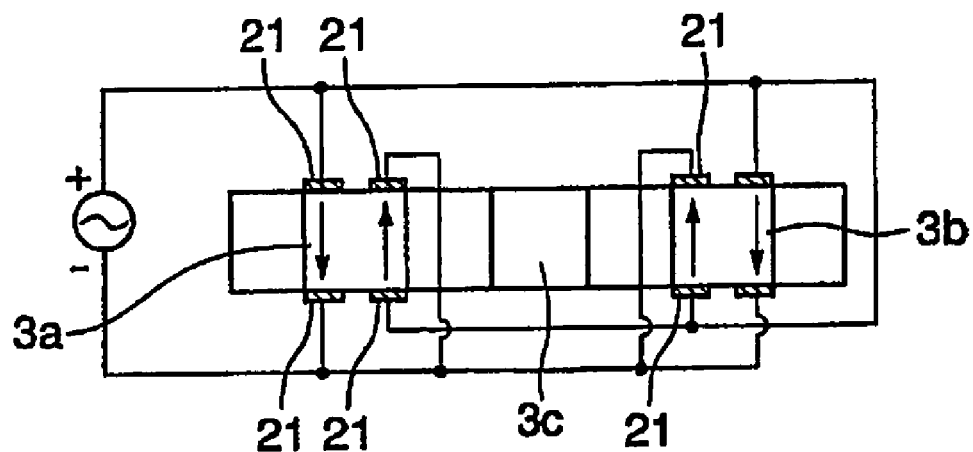
FIG. 3 is a schematic view of electrical wiring on a drive side of the six-arm piezoelectric vibratory gyroscope illustrated in FIGS. 2A to 2C.

The electrical wiring of the drive-side electrodes 21 is described with reference to FIG. 3.

At each of the exciting arms 3a and 3b, each of the two opposing drive-side electrodes 21 is connected with each pole of the alternating current power supply, and each of the two drive-side electrodes 21 adjacent to each other on the same surface is connected to each pole of the alternating current power supply. Furthermore, when the exciting arms 3a and 3b are viewed as a whole, the connection polarities with respect to the alternating current power supply are opposite for the drive-side electrodes 21 on the outer sides and the drive-side electrodes 21 on the inner sides. Accordingly, electrical wiring is connected so that the exciting arms 3a and 3b are excited in directions opposing each other in the thickness direction of the body 2. The directions of the electrical power lines of the drive-side electrodes 21 are indicated by arrows.

Figure 4:
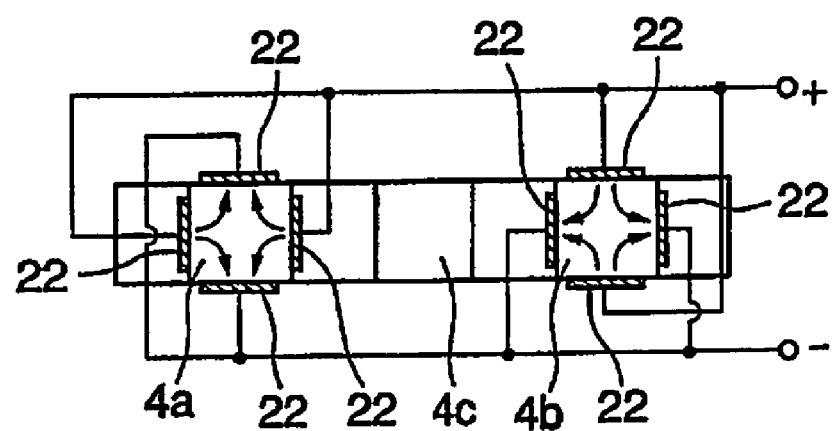
FIG. 4 is a schematic view of electrical wiring on a detection side of the six-arm piezoelectric vibratory gyroscope illustrated in FIGS. 2A to 2C.

The electrical wiring of the detection-side electrodes 22 is described with reference to FIG. 4.

At the detecting arm 4a, the two detection-side electrodes 22 opposing each other in the thickness direction of the detecting arm 4a are connected to the negative terminal of a detection apparatus (not shown in the drawing), and the other two detection-side electrodes 22 are connected to the positive terminals of the detection apparatus. The two detection-side electrodes 22 on the other detecting arm 4b opposing each other in the thickness direction of the detecting arm 4b are connected to the positive terminals of the detection apparatus, and the other two detection-side electrodes 22 are connected to the negative terminal of a detection apparatus. The directions of the electrical power lines of the detection arms 4a and 4b are indicated by arrows.

A six-arm piezoelectric vibratory gyroscope according to a second embodiment of the present invention will be described with reference to FIGS. 5 and 6. Components similar to those of the first embodiment are represented by the same reference numerals as the first embodiment and description thereof is omitted.

Figure 5:
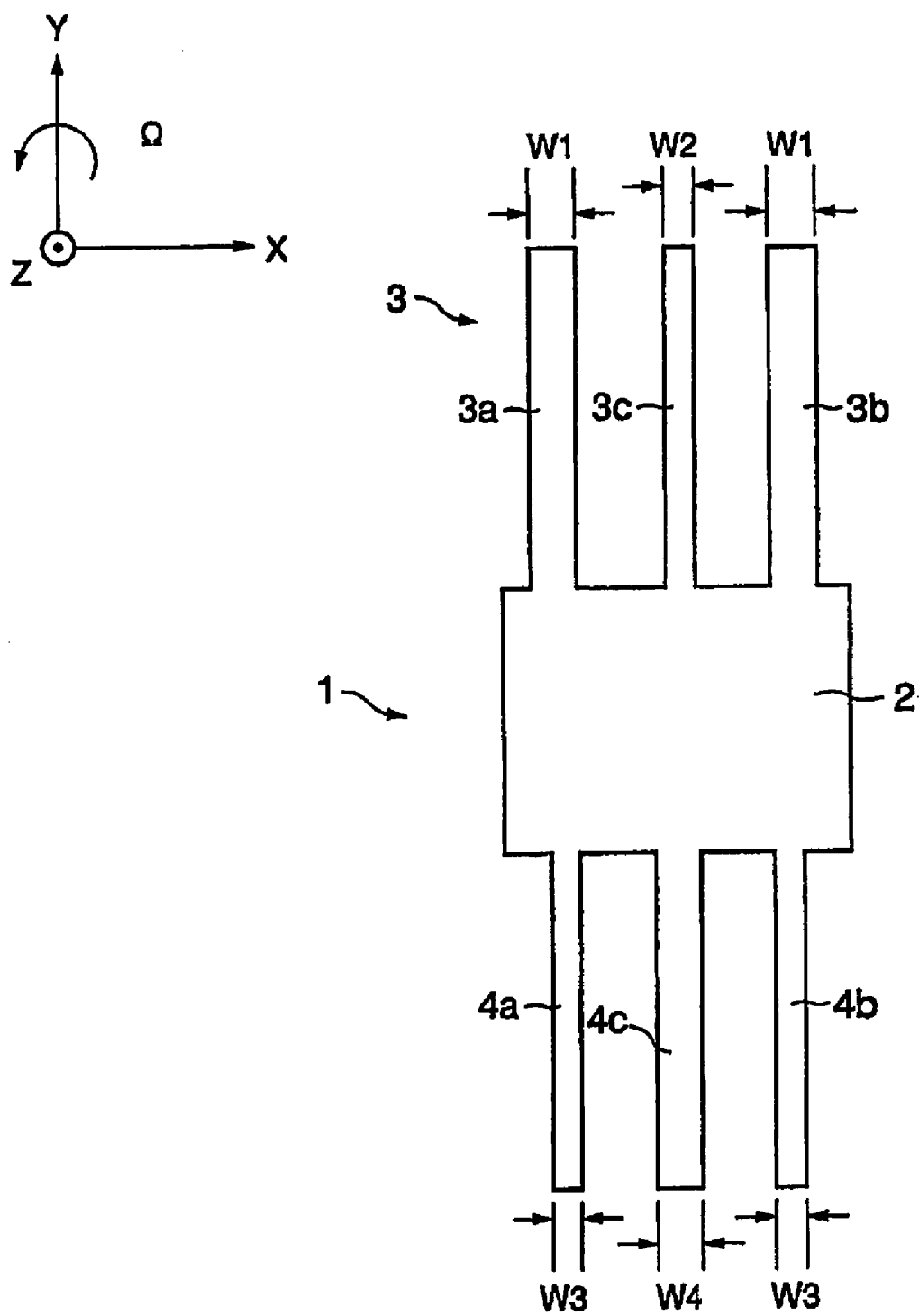
FIG. 5 is front view of a piezoelectric body included in a six-arm piezoelectric vibratory gyroscope according to a second embodiment of the present invention.

The piezoelectric body 1 shown in FIG. 5 is composed of Z-cut langasite. However, the piezoelectric body 1 may be composed of Z-cut quartz. The directionality and the active direction of the angular velocity Ω of langasite, which belongs to a trigonal crystal system, are represented by X, Y, and Z axes.

The piezoelectric body 1 includes the exciting arms 3a and 3b, the non-exciting arm 3c, the detecting arms 4a and 4b, and the non-detecting arm 4c, which are all prismatic and have an arm length of 6.0 mm. When the piezoelectric body 1 rotates around a Y axis at an angular velocity Ω, a Coriolis force is applied to the exciting arms 3a and 3b. Since this Coriolis force is applied in a direction perpendicular to the plane of the piezoelectric body 1, the exciting arms 3a and 3b carries out plane-perpendicular vibration. The body 2 functions to transmit this plane-perpendicular vibration to the pair of detecting arms 4a and 4b.

In the piezoelectric body 1, the width W1 of each of the exciting arms 3a and 3b is 400 μm. The width W2 of the non-exciting arm 3c is 360 μm, which is about 10% smaller than width W1. The width W3 of each of the detecting arms 4a and 4b is 370 μm, which is 7.5% smaller than W1. The width W4 of the non-detecting arm 4c is 420 μm, which is about 17% greater than width W2 of the non-detection arm 4c. In this way, the three arms of the drive-side arm unit 3 and the three arms of the detection-side arm unit 4 are set at the same weight and the center of gravity is matched with the geometric center of the body 2. By using such a piezoelectric body 1, when the piezoelectric body 1 rotates around the Y axis at an angular velocity Ω, the angular velocity Ω can be detected at the detecting arms 4a and 4b.

To support the center of gravity of the piezoelectric body 1 with alumina and to adjust the difference between the resonant frequency of the exciting arms 3a and 3b and the resonant frequency of the detecting arms 4a and 4b, detuning width processing is carried out on each tip of the exciting arms 3a and 3b and the detecting arms 4a and 4b. More specifically, detuning width processing is carried out to reduce the frequencies by forming films of gold (Au), which is a conductive material, on the tips by sputtering. In this way, the difference of the resonant frequency of the in-plane vibration and the resonant frequency of the plane-perpendicular vibration is adjusted to be 18 Hz.

As a result of determining the spurious vibration of the in-plane vibration of the piezoelectric body 1 by a finite element method (FEM eigenvalue) analysis and actual measurements, it was concluded that spurious vibration is not generated in the ±200 Hz range of the driving resonant frequency 7,830 Hz. It has also become apparent that highly sensitive gyro characteristics are obtained when a six-arm piezoelectric vibratory gyroscope produced using the piezoelectric body 1 is driven at a frequency of 7,830 Hz and a driving voltage of $1V_{p-p}$ and is rotated around the Y axis at an angular velocity Ω of 2 deg/s so that the gyro output is 0.26 mV.

Figure 6A:
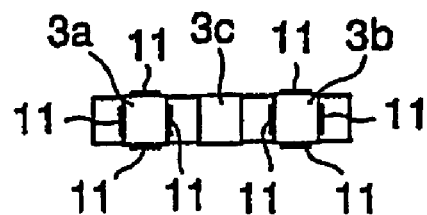
FIG. 6A is a top view of the six-arm piezoelectric vibratory gyroscope illustrated in FIG. 5 having electrodes coupled with the piezoelectric body.
Figure 6B:
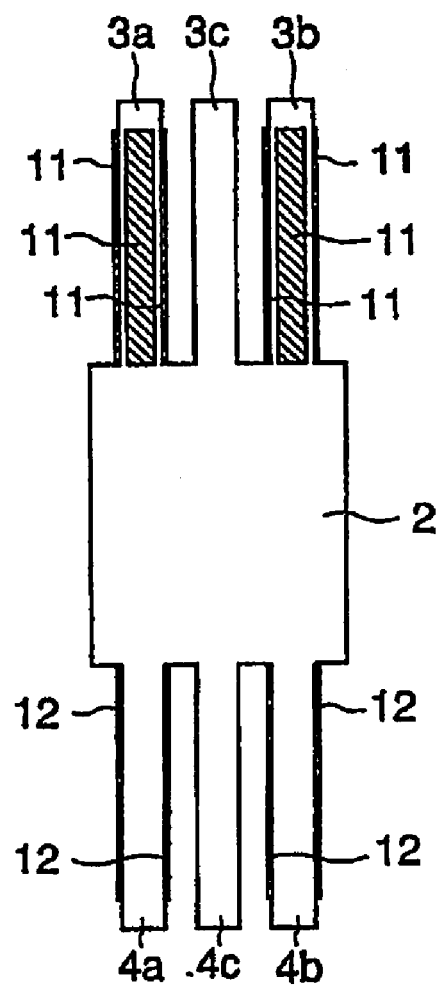
FIG. 6B is a front view of the six-arm piezoelectric vibratory gyroscope illustrated in FIG. 5A.
Figure 6C:
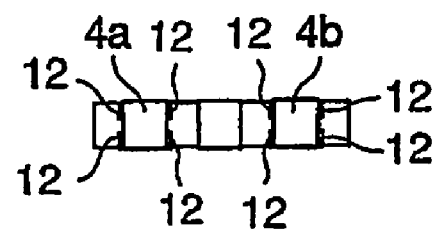
FIG. 6C is a bottom view of the six-arm piezoelectric vibratory gyroscope illustrated in FIG. 5A.

As illustrated in FIG. 6, each of the exciting arms 3a and 3b is coupled with a plurality of drive-side electrodes 11. In other words, each of the surfaces of each of the exciting arms 3a and 3b is coupled with one of the drive-side electrodes 11, wherein a total of four drive-side electrodes 11 are coupled with each of the exciting arms 3a and 3b. The drive-side electrodes 11 detect plane-perpendicular vibration of the exciting arms 3a and 3b and are disposed as strips.

Each of the detecting arms 4a and 4b is coupled with a plurality of detection-side electrodes 12. In other words, each of the front and back surfaces of each of the detecting arms 4a and 4b is coupled with two detection-side electrodes 12, wherein a total of four detection-side electrodes 12 are coupled with each of the detecting arms 4a and 4b. The detection-side electrodes 12 excite the in-plane vibration of the detecting arms 4a and 4b and are disposed as strips provided parallel to each other at a predetermined distance apart.

Figure 7:
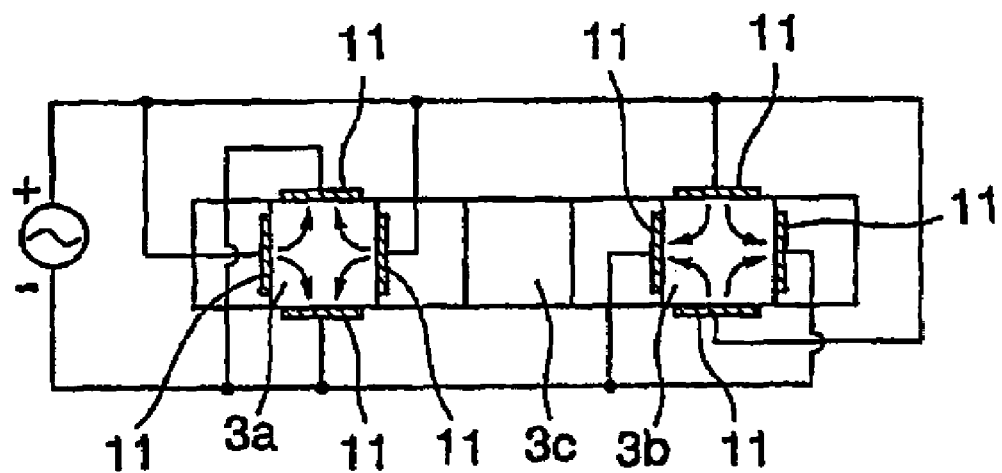
FIG. 7 is a schematic view of electrical wiring on a drive side of the six-arm piezoelectric vibratory gyroscope illustrated in FIGS. 6A to 6C.

The electrical wiring of the drive-side electrodes 11 is described with reference to FIG. 7.

At the exciting arm 3a, two drive-side electrodes 11 opposing each other in the thickness direction are connected with a first pole of the alternating current power supply, and the other two drive-side electrodes 11 are connected to a second pole of the alternating current power source. At the exciting arm 3b, two drive-side electrodes 11 opposing each other in the thickness direction are connected with the second pole of the alternating current power supply, and the other two drive-side electrodes 11 are connected to the first pole of the alternating current power source. The directions of the electrical power lines of the drive-side electrodes 11 are indicated by arrows.

Figure 8:
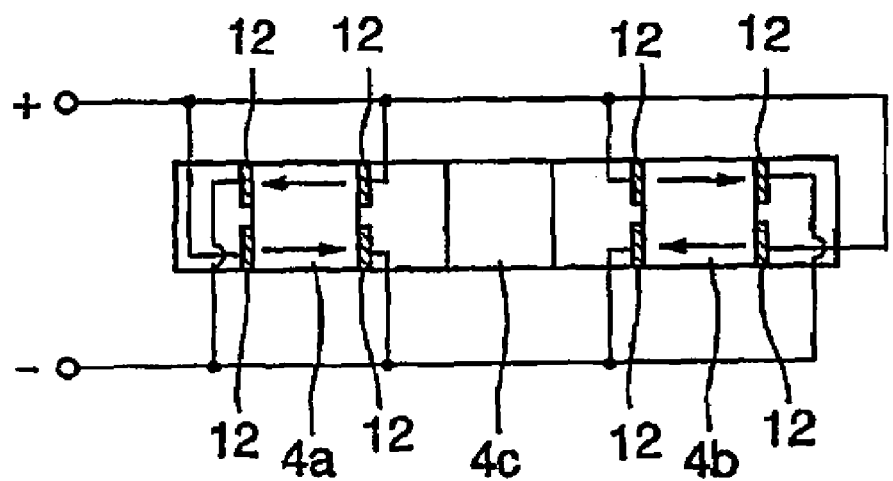
FIG. 8 is a schematic view of electrical wiring on a detection side of the six-arm piezoelectric vibratory gyroscope illustrated in FIGS. 6A to 6C.

The electrical wiring of the detection-side electrodes 12 is described with reference to FIG. 8.

At each of the detecting arms 4a and 4b, each of the two opposing detection-side electrodes 12 is connected with each pole of a detection apparatus (not shown in the drawing), and each of the two detection-side electrodes 12 adjacent to each other on the same surface is connected to each pole of the detection apparatus. Accordingly, electrical wiring is connected so that vibrations in opposing direction of the exciting arms 3a and 3b are detected. The directions of the electrical power lines of the detection arms 4a and 4b are indicated by arrows.

A piezoelectric body 1 according to another embodiment is described with reference to FIG. 9. Components similar to those of the first embodiment are represented by the same reference numerals as the first embodiment and description thereof is omitted.

Figure 9:
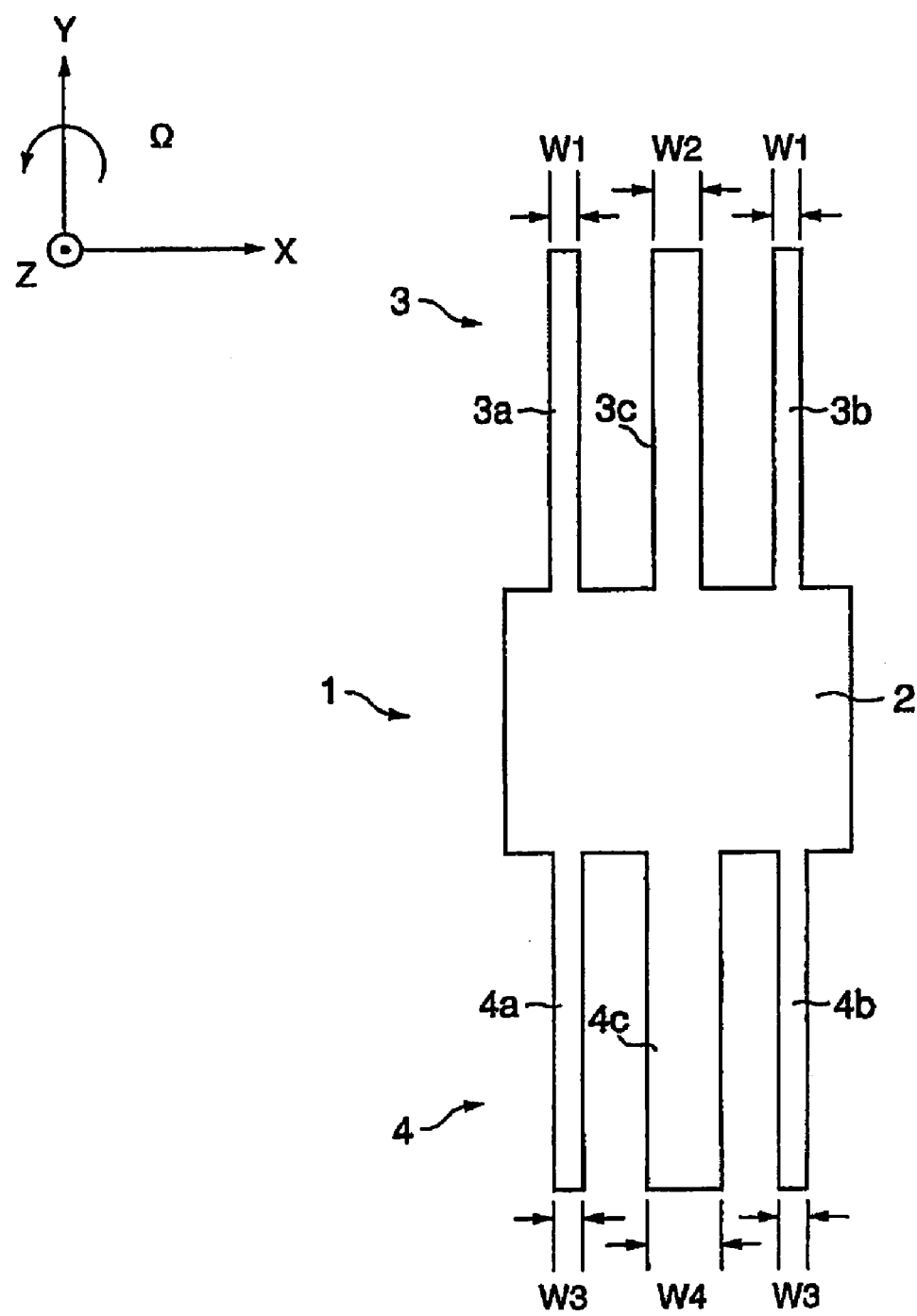
FIG. 9 is front view of a piezoelectric body included in a six-arm piezoelectric vibratory gyroscope according to another embodiment.

The piezoelectric body 1 shown in FIG. 9 is composed of Z-cut langasite. However, the piezoelectric body 1 may be composed of Z-cut quartz. The directionality and the active direction of the angular velocity Ω of langasite, which belongs to a trigonal crystal system, are represented by X, Y, and Z axes.

The piezoelectric body 1 includes the exciting arms 3a and 3b, the non-exciting arm 3c, the detecting arms 4a and 4b, and the non-detecting arm 4c, which are all prismatic and have an arm length of 6.0 mm. When the piezoelectric body 1 rotates around a Y axis at an angular velocity Ω, a Coriolis force is applied to the exciting arms 3a and 3b. Since this Coriolis force is applied in a direction perpendicular to the plane of the piezoelectric body 1, the exciting arms 3a and 3b generates plane-perpendicular vibration. The body 2 functions to transmit this plane-perpendicular vibration to the pair of detecting arms 4a and 4b.

In the piezoelectric body 1, the width W1 of each of the exciting arms 3a and 3b is 400 µm. The width W2 of the non-exciting arm 3c is 440 µm, which is 10% greater than the width W1. The width W3 of each of the detecting arms 4a and 4b is 380 µm, which is 5% smaller than the width W1. The width W4 of the non-detecting arm 4c is 480 µm, which is about 9% greater than the width W2 of non-excitation arm 3c. In this way, the three arms of the drive-side arm unit 3 and the three arms of the detection-side arm unit 4 have the same weight and the center of gravity is matched with the geometric center of the body 2. By using such a piezoelectric body 1, when the piezoelectric body 1 rotates around the Y axis at an angular velocity Ω, the angular velocity Ω can be detected at the detecting arms 4a and 4b.

To support the center of gravity of the piezoelectric body 1 with alumina and to adjust the difference between the resonant frequency of the exciting arms 3a and 3b and the resonant frequency of the detecting arms 4a and 4b, detuning width processing is carried out on each tip of the exciting arms 3a and 3b and the detecting arms 4a and 4b. In this way, the difference of the resonant frequency of the in-plane vibration and the resonant frequency of the plane-perpendicular vibration is adjusted to be 9 Hz.

As a result of determining the spurious vibration of the in-plane vibration of the piezoelectric body 1 by a finite element method (FEM eigenvalue) analysis and actual measurements, it was concluded that spurious vibration is not generated in the ±200 Hz range of the driving resonant frequency 9,361 Hz. It has also become apparent that highly sensitive gyro characteristics are obtained when a six-arm piezoelectric vibratory gyroscope produced using the piezoelectric body 1 is driven at a frequency of 9,361 Hz and a driving voltage of 1 $V_{p\text{-}p}$ and is rotated around the Y axis at an angular velocity Ω of 1 deg/s so that the gyro output is 0.062 mV.

A piezoelectric body 1 according to another embodiment is described with reference to FIG. 10. Components similar to those of the first embodiment are represented by the same reference numerals as the first embodiment and description thereof is omitted.

Figure 10:
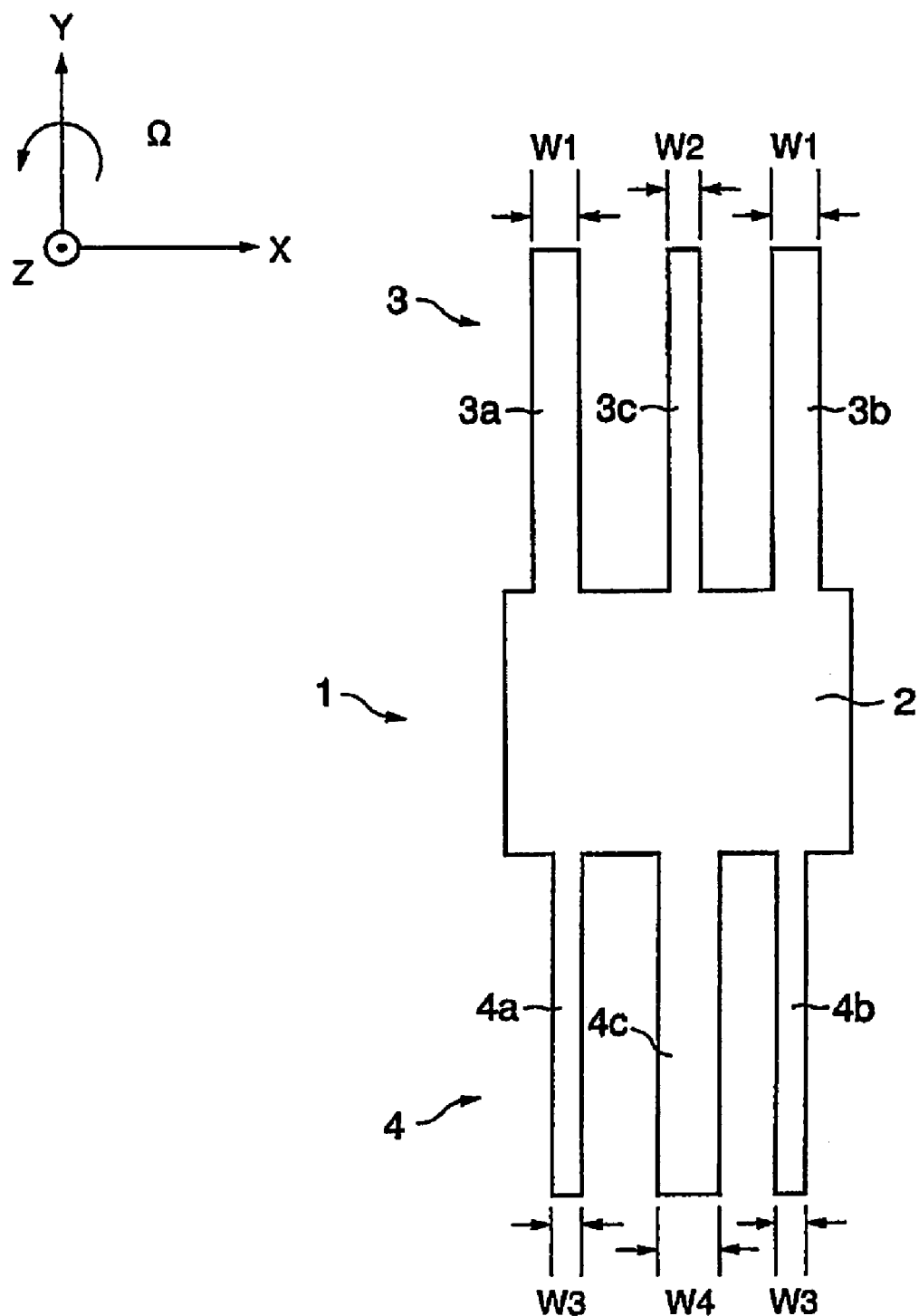
FIG. 10 is front view of a piezoelectric body included in a six-arm piezoelectric vibratory gyroscope according to another embodiment.

The piezoelectric body 1 shown in FIG. 10 is composed of Z-cut langasite. However, the piezoelectric body 1 may be composed of Z-cut quartz. The directionality and the active direction of the angular velocity Ω of langasite, which belongs to a trigonal crystal system, are represented by X, Y, and Z axes.

The piezoelectric body 1 includes the exciting arms 3a and 3b, the non-exciting arm 3c, the detecting arms 4a and 4b, and the non-detecting arm 4c, which are all prismatic and have an arm length of 6.0 mm. When the piezoelectric body 1 rotates around a Y axis at an angular velocity Ω, a Coriolis force is applied to the exciting arms 3a and 3b. Since this Coriolis force is applied in a direction perpendicular to the plane of the piezoelectric body 1, the exciting arms 3a and 3b generates plane-perpendicular vibration. The body 2 functions to transmit this plane-perpendicular vibration to the pair of detecting arms 4a and 4b.

In the piezoelectric body 1, the width W1 of each of the exciting arms 3a and 3b is 400 µm. The width W2 of the non-exciting arm 3c is 340 µm, which is 15% smaller than the width W1. The width W3 of each of the detecting arms 4a and 4b is 360 µm, which is 10% smaller than the width W1. The width W4 of the non-detecting arm 4c is 420 µm, which is about 24% greater than the width W2 of the non-excitation arm 3c. In this way, the three arms of the drive-side arm unit 3 and the three arms of the detection-side arm unit 4 have the same weight and the center of gravity is matched with the geometric center of the body 2. By using such a piezoelectric body 1, when the piezoelectric body 1 rotates around the Y axis at an angular velocity Ω, the angular velocity Ω can be detected at the detecting arms 4a and 4b.

To support the center of gravity of the piezoelectric body 1 with alumina and to adjust the difference between the resonant frequency of the exciting arms 3a and 3b and the resonant frequency of the detecting arms 4a and 4b, detuning width processing is carried out on each tip of the exciting arms 3a and 3b and the detecting arms 4a and 4b. In this way, the difference of the resonant frequency of the in-plane vibration and the resonant frequency of the plane-perpendicular vibration is adjusted to be 10 Hz.

As a result of determining the spurious vibration of the in-plane vibration of the piezoelectric body 1 by a finite element method (FEM eigenvalue) analysis and actual measurements, it was concluded that spurious vibration is not generated in the ±200 Hz range of the driving resonant frequency 9,353 Hz. It has also become apparent that highly sensitive gyro characteristics are obtained when a six-arm piezoelectric vibratory gyroscope produced using the piezoelectric body 1 is driven at a frequency of 9,353 Hz and a driving voltage of 1 $V_{p\text{-}p}$ and is rotated around the Y axis at an angular velocity Ω of 1 deg/s so that the gyro output is 0.061 mV.

A piezoelectric body 1 according to another embodiment is described with reference to FIG. 11. Components similar to those of the first embodiment are represented by the same reference numerals as the first embodiment and description thereof is omitted.

Figure 11:
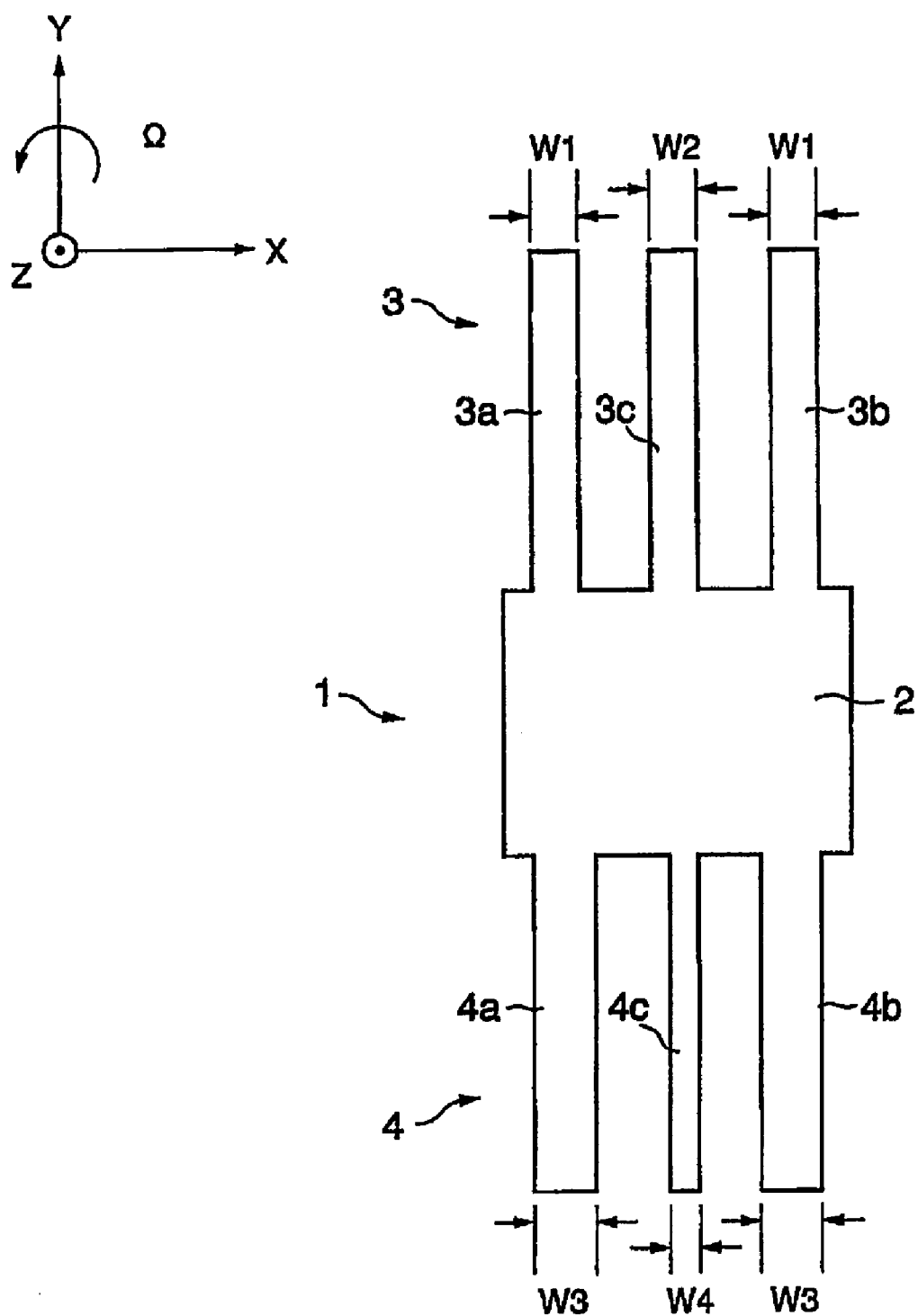
FIG. 11 is front view of a piezoelectric body included in a six-arm piezoelectric vibratory gyroscope according to another embodiment.

The piezoelectric body 1 shown in FIG. 11 is composed of Z-cut langasite. However, the piezoelectric body 1 may be composed of Z-cut quartz. The directionality and the active direction of the angular velocity Ω of langasite, which belongs to a trigonal crystal system, are represented by X, Y, and Z axes.

The piezoelectric body 1 includes the exciting arms 3a and 3b, the non-exciting arm 3c, the detecting arms 4a and 4b, and the non-detecting arm 4c, which are all prismatic and have an arm length of 6.0 mm. When the piezoelectric body 1 rotates around a Y axis at an angular velocity Ω, a Coriolis force is applied to the exciting arms 3a and 3b. Since this Coriolis force is applied in a direction perpendicular to the plane of the piezoelectric body 1, the exciting arms 3a and 3b generates plane-perpendicular vibration. The body 2 functions to transmit this plane-perpendicular vibration to the pair of detecting arms 4a and 4b.

In the piezoelectric body 1, the width W1 of each of the exciting arms 3a and 3b is 400 µm. The width W2 of the non-exciting arm 3c is 380 µm, which is 5% smaller than the width W1. The width W3 of each of the detecting arms 4a and 4b is 440 µm, which is 10% greater than the width W1. The width W4 of the non-detecting arm 4c is 300 µm, which is about 21% smaller than the width W2 of the non-excitation arm 3c. In this way, the three arms of the drive-side arm unit 3 and the three arms of the detection-side arm unit 4 have the same weight and the center of gravity is matched with the geometric center of the body 2. By using such a piezoelectric body 1, when the piezoelectric body 1 rotates around the Y axis at an angular velocity Ω, the angular velocity Ω can be detected at the detecting arms 4a and 4b.

To support the center of gravity of the piezoelectric body 1 with alumina and to adjust the difference between the resonant frequency of the exciting arms 3a and 3b and the resonant frequency of the detecting arms 4a and 4b, detuning width processing is carried out on each tip of the exciting arms 3a and 3b and the detecting arms 4a and 4b. In this way, the difference of the resonant frequency of the in-plane vibration and the resonant frequency of the plane-perpendicular vibration is adjusted to be 10 Hz.

As a result of determining the spurious vibration of the in-plane vibration of the piezoelectric body 1 by a finite element method (FEM eigenvalue) analysis and actual measurements, it was concluded that spurious vibration is not generated in the ±200 Hz range of the driving resonant frequency 9,361 Hz. It has also become apparent that highly sensitive gyro characteristics are obtained when a six-arm piezoelectric vibratory gyroscope produced using the piezoelectric body 1 is driven at a frequency of 9,361 Hz and a driving voltage of 1 $V_{p-p}$ and is rotated around the Y axis at an angular velocity $\Omega$ of 1 deg/s so that the gyro output is 0.063 mV.

As described above, in the six-arm piezoelectric vibratory gyroscope, the width of the exciting arms 3a and 3b and the width of the detecting arms 4a and 4b differ significantly. Therefore, the resonant frequency of the exciting arms 3a and 3b and the resonant frequency of the detecting arms 4a and 4b differ, and thus, spurious vibration of the detection-side in-plane vibration is not generated in the vicinity of the driving vibration frequency. As result, basic characteristics of high sensitivity and excellent stability are obtained.

As described above, the piezoelectric body 1 is composed of X-cut langasite crystal, X-cut quartz, Z-cut langasite crystal, or Z-cut quartz. The material of the piezoelectric body 1 is not limited since the same advantages as described above are obtained when, for example, 130°-rotated Y plate lithium tantalite or piezoelectric ceramic are used.

As described above, the six-arm piezoelectric vibratory gyroscope according to the present invention has different resonant frequencies of the in-plane vibration and does not generate spurious vibration of the detection-side in-plane vibration in the vicinity of the driving vibration frequency while in use. Therefore, when the gyroscope is produced, spurious vibration of the in-plane vibration of the piezoelectric body can be sufficiently prevented. Moreover, highly stable and highly accurate detection of an angular velocity by a high S/N ratio is possible with excellent gyro sensitivity. As a result, an angular velocity smaller than the rotational speed of the Earth can be detected with excellent resolution.

INDUSTRIAL APPLICABILITY

The six-arm piezoelectric vibratory gyroscope according to the present invention can be used as an angular velocity detector for a car navigation system or an attitude control system for ships.

The invention claimed is:

1. A piezoelectric vibratory gyroscope comprising:
a body; a pair of exciting arms extending from the body in a first direction with a space therebetween; a non-exciting arm extending from the body in the first direction between the exciting arms; a pair of detecting arms extending in a second direction opposite to the first direction from the body with a space therebetween; a non-detecting arm extending from the body in the second direction between the detecting arms; drive-side electrodes coupled with each of the exciting arms; and detection-side electrodes coupled with each of the detecting arms, wherein the exciting arms, the non-exciting arm, the detecting arms, and the non-detecting arm each consist of a piezoelectric body; the width of the exciting arms and the width of the nonexciting arm differ; the width of the exciting arms and the width of the detecting arms differ; and the width of the exciting arms and the width of the non-detecting arm differ.

2. The piezoelectric vibratory gyroscope according to claim 1, wherein the center of gravity matches the geometric center of the body.

3. The piezoelectric vibratory gyroscope according to claim 1, wherein the body is a rectangular plate having front and back surfaces as main surfaces and wherein the exciting arms, the non-exciting arm, the detecting arms, and the non-detecting arm extend parallel to the main surfaces.

4. The piezoelectric vibratory gyroscope according to claim 1, wherein the drive-side electrodes excite the exciting arms in opposite phases with respect to each other.

5. The piezoelectric vibratory gyroscope according to claim 1, wherein the width of the non-exciting arm is 2% to 60% larger than the width of the exciting arms, the width of the detecting arms is 1% to 30% larger than the width of the exciting arms, and the width of the non-detecting arm is 2% to 60% smaller than the width of the non-exciting arm.

6. The piezoelectric vibratory gyroscope according to claim 1, wherein the width of the non-exciting arm is 2% to 60% larger than the width of the exciting arms, the width of the detecting arms is 1% to 30% smaller than the width of the exciting arms, and the width of the non-detecting arm is 2% to 60% greater than the width of the non-exciting arm.

7. The piezoelectric vibratory gyroscope according to claim 1, wherein the width of the non-exciting arm is 2% to 60% smaller than the width of the exciting arms, the width of the detecting arms is 1% to 30% greater than the width of the exciting arms, and the width of the non-detecting arm is 2% to 60% smaller than the width of the non-exciting arm.

8. The piezoelectric vibratory gyroscope according to claim 1, wherein the width of the non-exciting arm is 2% to 60% smaller than the width of the exciting arms, the width of the detecting arms is 1% to 30% smaller than the width of the exciting arms, and the width of the non-detecting arm is 2% to 60% greater than the width of the non-exciting arm.

9. The piezoelectric vibratory gyroscope according to claim 1, wherein the geometric center of the body is supported.

10. The piezoelectric vibratory gyroscope according to claim 1, wherein at least one of the exciting arms and the detecting arms comprise predetermined sections where detuning width processing has been carried out so as to adjust the difference of the resonant frequencies of the exciting arms and the detecting arms.

11. The piezoelectric vibratory gyroscope according to claim 10, wherein the detuning width processing comprises the processing carried out on the predetermined sections.

12. The piezoelectric vibratory gyroscope according to claim 11, wherein the detuning width processing comprises forming of conductive films by sputtering on the predetermined sections.

13. The piezoelectric vibratory gyroscope according to claim 12, wherein the detuning width processing further comprises laser trimming carried out on the conductive films.

* * * * *